J. Mackey,
Planing Metal,
N° 5,736. Patented Aug. 29, 1848.
Fig. 1
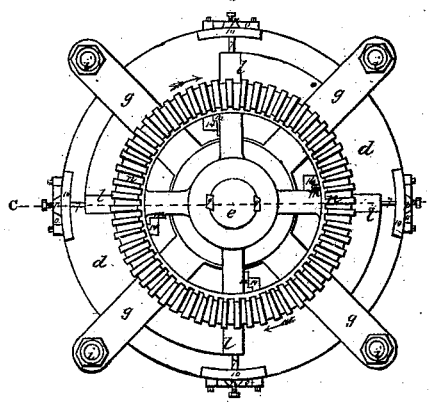
Fig. 2
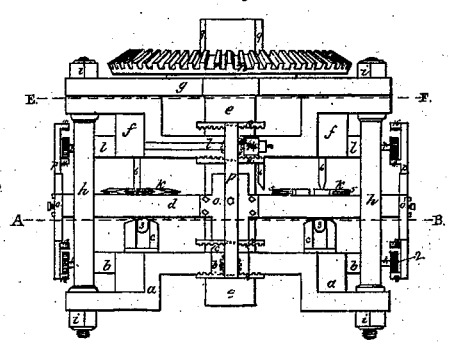
Fig. 3
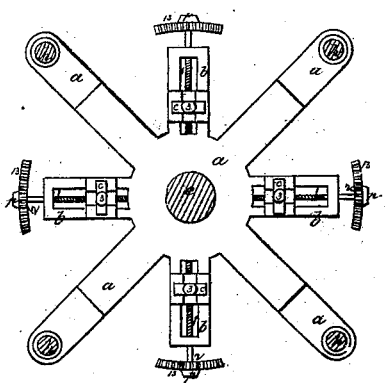
Fig. 4
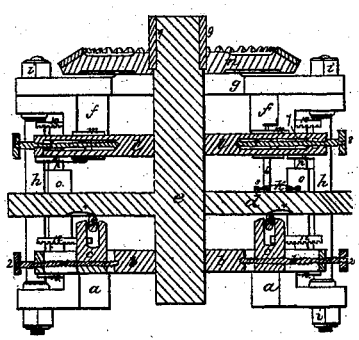
Fig. 5
Fig. 6
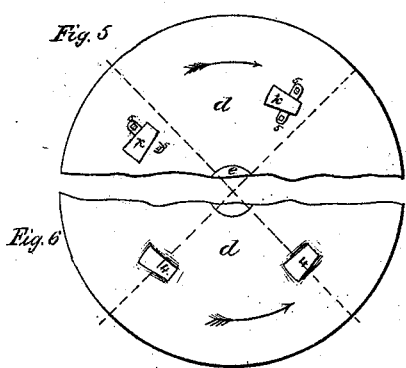
Fig. 7
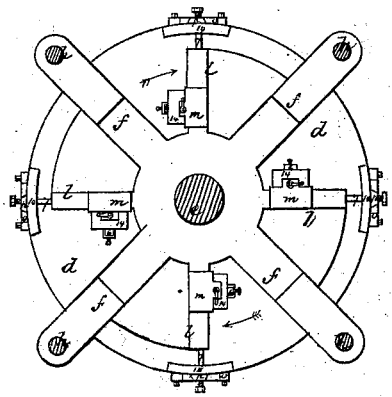
Witnesses:
Chas Hartshorn
Charles Byrne
Inventor:
John Mackey

UNITED STATES PATENT OFFICE.

JOHN MACKEY, OF NAPANOCH, NEW YORK.

MACHINERY FOR DRESSING AXES, &c.

Specification of Letters Patent No. 5,736, dated August 29, 1848.

*To all whom it may concern:*

Be it known that I, JOHN MACKEY, of Napanoch, Warwarsing township, Ulster county, State of New York, machinist, have invented and made and applied to use certain new and useful improvements in the application, constructive arrangement, and conjoined operation of well-known mechanical means for planing the faces of axes of any kind or size, so as to make both faces alike, and to plane several axes at once by the operation of a rotary molding-disk carrying the axes, fixed thereon, beneath and to be planed progressively by adjustable and traveling slide-rest cutters, which improvements are also available for other and similar uses, and for which improvements I seek Letters Patent of the United States; and that the said improvements are constructively, operatively, and substantially set forth and shown in the following description and in the drawing annexed to and making part of this specification, wherein—

Figure 1, is a general plan; and Fig. 2, a general elevation, of a complete machine; Fig. 3, is a plan of the frame, supporting columns, and carrying rollers of the machine, at the line A, B, of Fig. 2; Fig. 4, is a sectional elevation through the line C, D, of Fig. 1, showing the axes, as under the operation of the cutters; Fig. 5, is a half plan of the upper side of the rotary planing disk *d*, representing two axes in place for planing them; Fig. 6, is a like half plan, of the under side of the disk *d*, showing the position of the shaping or molding hollows, and the lines of travel, on the supporting rollers beneath; Fig. 7, is a plan of the operative parts and cutter, at the line E, F, of Fig. 2; and the same letters and numbers, as marks of reference, apply alike to the same parts, in all the several figures.

*a, a*, are the parts of a lower spider frame, between which are arms *b, b*, projected from the center block, and having vertical slots, or mortises, forming the arms into slides, the slots of which receive the nut parts of slide carriages *c, c*, each fitted, at top, with a roller 3, and through the nut parts, is a slide screw 1, with a pinion 2, at the outer end, these arms *b*, and carriages *c*, with the rollers 3, sustain a strong metal disk *d*, forming a horizontal face chuck, mounted on, and secured to, a vertical mandrel shaft *e*, this is stepped in the center of the lower spider frame *a*, so as to allow a slight vertical motion, as shown hereafter; the upper part of the mandrel shaft *e*, goes through a second spider frame *f*, set in reverse to the frame *a*. Between the frames *a*, and *f*, are columns or standards *h, h*, and above the frames *f*, is a flat frame *g*, the standards *h, h*, are either fitted with screws, or made hollow, to pass a bolt through them, in either case, nuts *i, i*, secure the three frames and the standards *h, h*, together, and a large bevel or face gear wheel *n*, above all is fitted on the shaft *e*, by two slide keys 9, 9, that allow the disk *d*, and mandrel *e*, the slight vertical vibration already noticed, when the machine is put in motion by a pinion and power, applied to the large wheel *n*.

The upper spider frame *f*, is fitted with arms *l, l*, made with horizontal slots, or mortises, and sustained by brackets behind the line of motion, but otherwise, nearly the same as the arms *b, b*, to receive the first parts of slide rests *m, m*, which have each a nut in the slot of the arm, to take slide screws 7, 7, each with a pinion 8, on the outer end; the second, or vertically acting part, 14, of each slide rest, is fitted with a screw to adjust the position of the cutter tools 6, in the usual manner. On the edges of the disk or face chuck *d*, are flanged plates *o, o*, bolted on, and formed to serve as guide slides for vertical bars *p, p*, each of these is fitted, near the top, with a short horizontally segmental tooth rack 10, acting downward, and a similar rack 11, blow acting upward, and near the bottom, are two similarly acting tooth racks 12 and 13, these give motion to the carriages, the rollers, and cutter tools, as hereafter shown. On the underside of the disk or face chuck *d*, are hollows 4, 4, countersunk to nearly the form of one side, or face, of an ax, of the size for which the machine is intended. On the upper face of the disk *d*, hollows are countersunk, to receive rough axes *k, k*, these have each, through the eye, a short bar 5, made with a hole at each end, to receive short studs, in the face of the chuck *d*, and hold the ax in place, by nuts on, or keys through, the points of the studs.

The axes *k, k*, on the upper face of the chuck *d*, are placed just so much behind the hollows 4, 4, beneath, as the cutters 6, 6, are in advance of the radial line of motion of the rollers 3, 3, below the chuck *d*, and these hollows are formed, and placed, so that when the head of each ax approaches a cutter, the chuck $d$, descends, until the cutter has cut a curved line, to the center of the eye of the ax, when the chuck rises again, over the roller, in a line corresponding to that curvilinear form, which the cutter is to produce, on the face, from the head and eye, to the edge of the ax. By taking so much of the machine apart, as will allow of changing the disk $d$, and shafts $e$, and in some cases, substituting different rollers 3, 3, the other parts of the machine may be used, to form larger, or smaller axes, or for other, or similar purposes, as set forth hereafter. When thus constructed, and adjusted for use, the operations of this machine are as follows:

Motion being given, by the application of any competent moving power, to the gear wheel $n$, so that the face chuck or disk $d$, moves in the direction of the circular arrows, the axes, or other articles to be planed other than in right lined forms, are passed under the cutter 6, 6, each cutter taking off a shaving, during the passage, and each cut assuming the form, given by the alternate rising and descending of the disk $d$, by the hollows 4, upon the rollers 3, and these effects will be produced alike, whether the cutters 6, and rollers 4 are approaching the center of the machine, by the operation of the upper racks 10, and 12, upon the upper teeth of the pinions 2, and 8, or the rollers and cutters are diverging from the center by the operation of the lower racks 11, and 13, on the lower teeth of the same pinions, as the change is to be made, by drifting the vertical positions of the bars $p$, $p$, and the racks they carry, so that the opposite racks work the pinions 2, and 8, and the screws 1, and 7, both in the opposite directions, which carries the slide rests, $m$, and the cutters 6, in either direction of the radial line, to operate upon the materials, or articles, beneath them; and the machine being adjusted to change the lead, or cut, of each cutter tool 6, successively, after it has passed one ax, or article beneath, and intermediary between that, and the commencement of the cut on the next ax, or other article under the cutter, no other than a direct strain is brought upon the cutter 6, while taking the shaving off the ax, or article beneath. In this manner, the faces of the articles operated on by the cutters 6, will be shaped with a convexity of form, the converse of the concavities, or hollows 4, 4, in the lower face of the chuck $d$, while by reversing the forms, and placing convexities, of any character, on the lower face of the chuck $d$, the articles, on the upper face, will be cut, or planed so as to produce the converse concavities, in, or on, the article, or articles, on the upper face of the disk or chuck $d$. When one side of each, of any given number of axes, or other articles, that this machine is fit to operate on, is thus completed, planed, and formed, the finished side is to be turned downward, and the article secured for cutting the other face, or side, and the slide $p$, are changed, vertically, for the opposite racks to act on the teeth of the pinions 2 and 8, and lead the carriages $c$, $c$, rollers 1, slide rests $m$, and cutters 6, in the opposite radial line of direction, when adjusted vertically to the difference in the thickness of the material beneath.

The axes are described, as in hollows on the face of the chuck $d$, and the motive power, as communicated through a gear wheel $n$; but the axes, or other articles, may be placed on any proper point, on the flat surface, and any other usual means may be employed, to connect the machine with the motive power.

The original design of this machine, was, that it should be competent to plane and form the faces of axes, and leave the articles in a state of completeness, only requiring the usual and ordinary tempering, and burnishing. But it will be evident, to every competent mechanic that these arrangements fit such a machine, to operate in a like manner, and with the like effects, on many other articles, that require to be formed, and finished, in other than straight lines, or in compounds of straight and curved lines; therefore, it is not intended to limit the use of this machine, to the planing of axes, merely, but to use the same, in effecting any other similar operations, for which it either is competent, as described and shown, or for which it can be made competent, by any merely mechanical variations that will effect any given and required object, without any substantial departure from the arrangement, and operation of the parts, as herein described and shown.

I am aware that machines have already been made, and are extensively used, to give various irregular figures to different materials; but I do not know of any machine, in which the material to be formed, is presented to the operation of an adjustable standing cutter, by the movement of a rotary disk, or face chuck, which has a slight vibratory motion, in the direction of its own axis; nor do I know of any other single machine, for these purposes, capable of operating on, and forming, or planing to one form, a multiplicity of articles, of irregular shape, and of equal size, and form, at one and the same time.

I do not claim to have invented any of the parts herein described and shown, as used by me for these purposes; but What I do claim as new, and of my own invention, and desire to secure by Letters Patent of the United States, is—

1. The application of a rotary disk, or face chuck $d$, having a small vibratory motion in the direction of its own axis, such vibratory motion being given, by constructing the disk with either convexities, or concavities, on, or in, the underside of the disk, or chuck; and passing these over rollers, in such a manner, that any material, secured on the upper surface of the chuck, shall be presented to the operation of standing adjustable cutters, that shall form the surfaces of the materials, in the converse of the forms of the convexities, or concavities, on, or in, the under side of the disk; and I claim the means of giving the bearing and shaping rollers 3, 3, and cutter tools 6, the required motion, in a radial line toward, or from, the center of the machine, by the conjoint application of the adjustable vertical bars $p$, $p$, and the short intermittent racks 10, 11, 12, and 13, to take the pinions 2, and 8, and turn the slide screws 1 and 7, in the proper direction for giving the bearing rollers 3, 3, the required successive positions for supporting, and vibrating the chuck, and giving the cutting tools 6, the proper positions for operating, by successive cuts, upon the materials secured on the face of the chuck.

2. And I claim the constructive arrangement, and conjoined operation of the foregoing parts, either applied to planing the faces of a multiplicity of axes, or to planing a multiplicity of any other irregular forms, for which such a machine may be available, substantially in the manner, and with the effects, hereinbefore described and shown.

In witness whereof, I have hereunto set my hand, at Napanoch aforesaid, this twentieth day of August, one thousand eight hundred and forty seven.

JOHN MACKEY.

Witnesses:
 CHAS. HARTSHORN,
 CHARLES McGUIRE.